United States Patent Office 2,810,749
Patented Oct. 22, 1957

2,810,749
DICYCLOHEXYLADIPIC ACID

John F. Nobis and Raymond W. Horst, Cincinnati, Ohio, assignors to National Distillers and Chemical Corporation, New York, N. Y., a corporation of Virginia No Drawing. Application July 13, 1955,
Serial No. 521,876

4 Claims. (Cl. 260—514)

The present invention relates to a novel chemical compound, namely dicyclohexyladipic acid.

The novel chemical compound embodied herein may be prepared by subjecting diphenyladipic acid to reaction with hydrogen under hydrogenation conditions, preferably in the presence of a suitable diluent and a hydrogenation catalyst. For example, $\alpha,\alpha'$-diphenyladipic acid may be mixed with a suitable solvent, such as glacial acetic acid, and the resulting solution subjected to hydrogenation in presence of a suitable hydrogenation catalyst (e. g., palladium on carbon), at a pressure of about 1500 to about 200 p. s. i. and a temperature of about 150° C. for several hours. Following hydrogenation of the diphenyladipic acid, the resulting mixture may be filtered to remove the catalyst, and the filtrate treated for removal of solvent whereby dicyclohexyladipic acid is produced as a white crystalline product.

In the preparation of dicyclohexyladipic acid as embodied herein by hydrogenation of diphenyladipic acid, a suitable method for preparation of the diphenyladipic acid in relatively high yields with resultant corresponding high yields of dicyclohexyladipic acid comprises selective dimerization of styrene in presence of metallic sodium to yield disodio-derivatives that, upon carbonation followed by acidification, yield substantially pure diphenyladipic acid. For example, diphenyladipic acid in high yields may be prepared by selective dimerization of styrene in the presence of finely dispersed sodium or potassium in a suitable liquid medium (e. g., ethylene glycol diethyl ether) and a relatively small amount of a polycyclic aromatic compound (e. g., o-terphenyl) at a temperature below about 0° C. whereby the dialkali metal derivative of dimerized styrene results, followed by carbonating (e. g., solid carbon dioxide) the dialkali metal derivative and acidification (e. g., hydrochloric acid) of the carbonated product to yield diphenyladipic acid. In this manner, $\alpha,\alpha'$-diphenyladipic acid was prepared by reaction of styrene with finely dispersed sodium and used for preparation of dicyclohexyladipic acid as described hereinafter.

In a specific embodiment, 47.7 grams of the $\alpha,\alpha'$-diphenyladipic acid (neutralization equivalent=149.4) was dissolved in 150 cc. of glacial acetic acid. A hydrogenation catalyst (5% palladium on carbon) was added to the solution of diphenyladipic acid and glacial acetic acid in an amount of 1.75% by weight of palladium based on the weight of diphenyladipic acid, and the resulting mixture was subjected to reaction with hydrogen for six hours at 150° C. while maintaining pressure at 1500–2000 p. s. i. The amount of hydrogen consumed during the reaction was substantially equivalent to that theoretically required to convert the diphenyladipic acid to dicyclohexyladipic acid. Following the hydrogenation reaction, the reaction mixture was filtered to remove the catalyst and the filtrate was diluted with water to precipitate dicyclohexyladipic acid as a white crystalline solid (neutralization equivalent of 155.72, theoretical for dicyclohexyladipic acid=155.2).

Further analysis of the white crystalline product gave the following values:

| | Percent | |
|---|---|---|
| | C | H |
| Found | 69.60 | 9.90 |
| Calculated for dicyclohexyladipic acid ($C_{18}H_{30}O_4$) | 69.64 | 9.74 |

As aforesaid, the novel chemical compound embodied herein possesses utility for many purposes, including usage as a chemical intermediate and in preparation of polyesters, polyamides, resins, plasticizers, synthetic lubricants, and the like. In particular, dicyclohexyladipic acid has been found to be a suitable component of a dicarboxylic acid reactant for reaction with a suitable diamine under condensation polymerization conditions to prepare synthetic linear condensation polyamides that are cold-drawable and are of improved transparency characteristics. For example, and in the use of a dicarboxylic acid such as sebacic acid for reaction with a diamine such as hexamethylene diamine under condensation polymerization conditions to form polyamides that are cold-drawable, the polyamides thus produced are generally opaque materials. However, by use of dicyclohexyladipic acid as a component of the acidic reactant for preparation of polyamides, polyamides can be produced that are clear products possessing cold-drawable characteristics and, additionally, are of improved characteristics with respect to resistance to water absorption whereby they possess improved dimensional stability when exposed to conditions of high humidity.

In illustration, one part of hexamethylene diammonium dicyclohexyladipate, made by neutralizing dicyclohexyladipic acid with hexamethylene diamine to pH 8.3 at 10% concentration in water, was mixed with one part of hexamethylene diammonium sebacate (M. P. 178–179° C.). The resulting slurry was polymerized by first distilling off the free water at atmospheric pressure and then heating for four hours at 260° C. under oxygen-free nitrogen. Vacuum was then applied at 260° C. for four more hours to complete the elimination of water whereby a clear polyamide was produced that was fiber-forming to cold-drawable fibers; whereas cold-drawable polyamides prepared by use of hexamethylene diamine and sebacic acid or adipic acid, and without use of dicyclohexyladipic acid, where opaque products. Moreover, a polyamide prepared as aforedescribed from dicyclohexyladipic acid, upon being subjected to test to determine water absorption characteristics by immersing a film of the polyamide in water for a period of about 80 hours, was found to absorb only 3% water whereas, under corresponding conditions, a commercial polyamide (nylon) prepared from hexamethylene diamine and adipic acid absorbed 8% by weight of water.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. $\alpha,\alpha'$-dicyclohexyladipic acid.

2. A method for preparing $\alpha$-$\alpha$-dicyclohexyladipic acid which comprises hydrogenating $\alpha$-$\alpha'$-diphenyladipic acid in the presence of a hydrogenation catalyst.

3. A method, as defined in claim 2, wherein the hydrogenation of $\alpha$-$\alpha'$-diphenyladipic acid is carried out at a pressure of from about 1500 to about 2000 p. s. i. and at about 150° C.

4. The method of claim 2 wherein said hydrogenation catalyst is palladium.

References Cited in the file of this patent

UNITED STATES PATENTS

| | | |
|---|---|---|
| 1,703,186 | Adams | Feb. 26, 1929 |
| 2,601,224 | Roedel | June 24, 1952 |

OTHER REFERENCES

McElvain et al.: Jour. Am. Chem. Soc., vol. 73 (1951), pg. 450.

Shunk et al.: Jour. Am. Chem. Soc., vol. 71 (1949), pg. 3947.

UNITED STATES PATENT OFFICE
Certificate of Correction

Patent No. 2,810,749　　　　　　　　　　　　　　　　October 22, 1957

John F. Nobis et al.

It is hereby certified that error appears in the printed specification of the above numbered patent requiring correction and that the said Letters Patent should read as corrected below.

Column 1, line 26, for "200 p. s. i." read —2000 p. s. i.—; column 2, line 50, for "where" read —were—; line 67, for "a-α-" read —α-a'- —.

Signed and sealed this 17th day of December 1957.

[SEAL]

Attest:
KARL H. AXLINE,
*Attesting Officer.*

ROBERT C. WATSON,
*Commissioner of Patents.*